United States Patent [19]

Land

[11] 4,172,640
[45] Oct. 30, 1979

[54] MOVIE CAMERA HAVING SUPPLEMENTAL EXPOSURE

[75] Inventor: Edwin H. Land, Cambridge, Mass.

[73] Assignee: Polaroid Corporation, Cambridge, Mass.

[21] Appl. No.: 865,845

[22] Filed: Dec. 30, 1977

[51] Int. Cl.² ............................................. G03B 23/02
[52] U.S. Cl. ...................................... 352/72; 352/46; 355/67; 354/126
[58] Field of Search ............... 352/44, 45, 46; 355/67, 355/68, 70, 71; 354/126

[56] References Cited

U.S. PATENT DOCUMENTS

| 1,990,396 | 2/1935 | Ballard | 355/68 |
| 2,135,575 | 11/1938 | Hansch | 354/126 |
| 2,331,335 | 10/1943 | Mayer | 355/69 |
| 2,621,569 | 12/1952 | Glassey | 354/126 |
| 3,455,633 | 7/1969 | Land | 355/77 |
| 3,484,165 | 12/1969 | Denner | 355/67 |
| 3,528,737 | 9/1970 | Denner | 355/67 |
| 3,577,898 | 5/1971 | Bragg | 355/71 |
| 3,709,588 | 1/1973 | Land | 352/78 R |
| 3,819,376 | 6/1974 | Land | 96/45.2 |
| 3,823,413 | 7/1974 | Cole | 355/70 |
| 3,827,071 | 7/1974 | Turpin | 355/71 |
| 3,836,923 | 9/1974 | Malick | 355/67 |
| 3,854,815 | 12/1974 | McIntosh | 355/67 |
| 3,905,701 | 9/1975 | David | 355/71 |
| 4,021,831 | 5/1977 | Bercher | 354/126 |

FOREIGN PATENT DOCUMENTS 1484890 9/1977 United Kingdom .

Primary Examiner—Monroe H. Hayes
Attorney, Agent, or Firm—David R. Thornton

[57] ABSTRACT

A motion picture camera having an in-camera supplemental exposure system in which a light source within the camera is energized in synchronization with the shutter opening to provide a low-level, non-image forming exposure of the film substantially simultaneously with the image-forming exposure. The supplemental exposure light is directed to the side of the film's emulsion layer opposite from the side exposed to the image-forming light. The camera also includes an arrangement permitting adjustment of the length of time that the supplemental light remains energized, and the intensity of the supplemental light. In one embodiment selection of the wavelength of the supplemental light is also provided.

6 Claims, 9 Drawing Figures

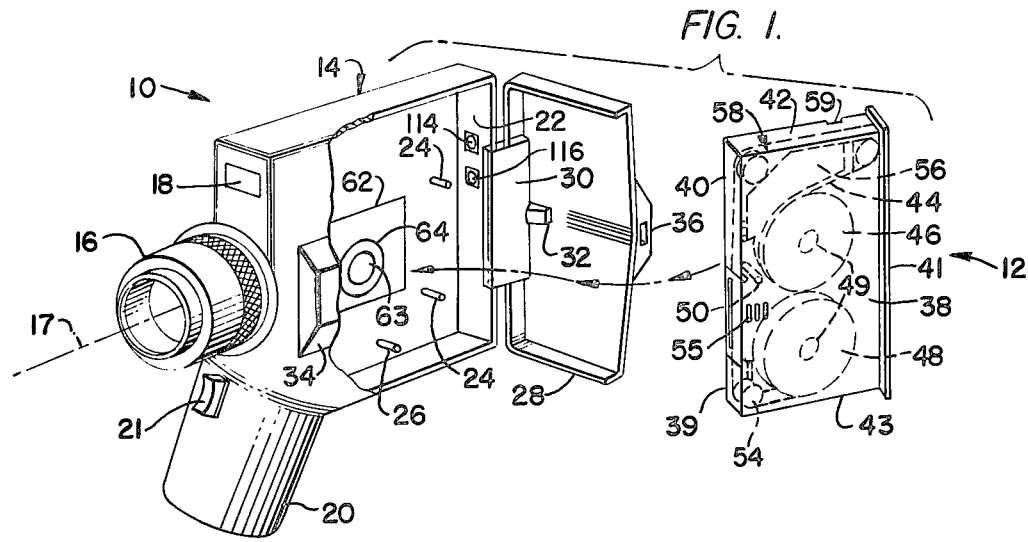
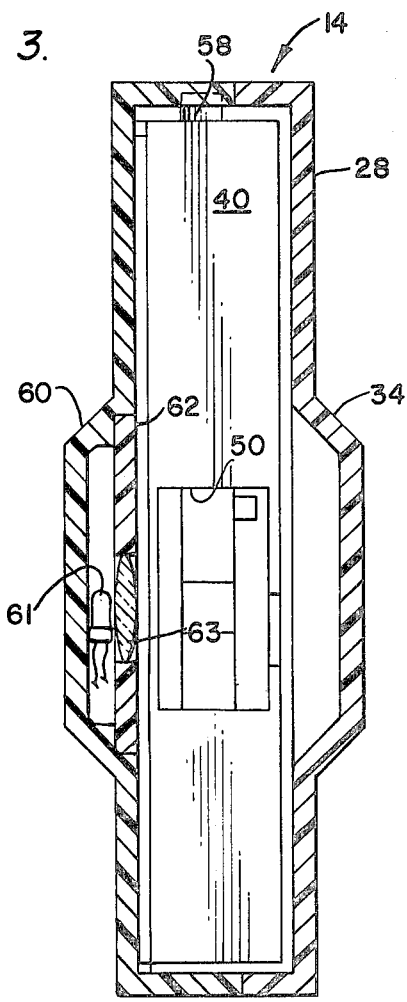
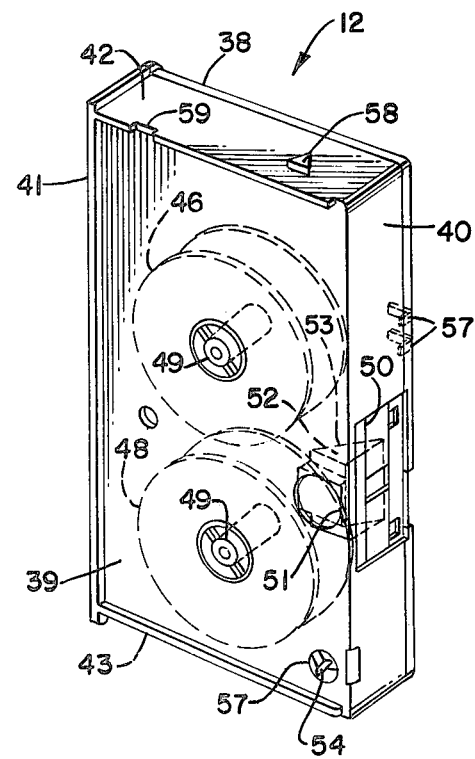

MOVIE CAMERA HAVING SUPPLEMENTAL EXPOSURE

BACKGROUND OF THE INVENTION

This invention relates to speed enhancement of photographic film and, more particularly, it concerns a method and apparatus by which the sensitivity of photographic film to scene light may be increased by exposure of the film to a camera-contained supplemental light source.

It is known that the effective speed of photographic films can be increased by exposing the film to a low level, non-image forming light source either during fabrication of the film, during exposure of the film to image-forming light, as in a camera, or following removal from the camera. Exemplary disclosures of these techniques are found in U.S. Pat. No. 3,819,376, issued June 25, 1974 to Edwin H. Land (during film fabrication); U.S. Pat. Nos. 3,484,165, issued Dec. 16, 1969 to J. R. Denner, No. 3,577, 898, issued May 11, 1971 to Herbert E. Bragg, No. 3,823,413, issued July 9, 1974 to Melrose R. Cole, and No. 3,827,071, issued July 30, 1974 to G. L. Turpin (during film exposure in a camera); and U.S. Pat. No. 3,455,633, issued July 15, 1969 to Edwin H. Land (during the development or processing of exposed film). Of these basic approaches, the subjection of photographic film to a supplementary, uniform light source at about the time it is exposed to imaging light is advantageous in that any effects of aging on the enhanced film sensitivity are eliminated and, further, it offers a potential for correlating the supplementary, speed-enhancing light in accordance with scene light.

The prior art represented by the aforementioned Denner, Bragg, Turpin and Cole patents recognizes two approaches to the supplemental exposure of film in a camera. In the Denner and Bragg patents, a source of supplemental light external to the camera is used while in the Turpin and Cole patents internal camera light sources are used. In the latter arrangements, however, a problem is presented by the requirement that the camera area in front of the film transmit both image-forming light and the supplemental light. Thus, in order to achieve uniformity of non-image-forming supplemental light, an annular array of light sources is required.

In several issued U.S. patents which are assigned to the assignee in common with the assignee of the present invention, motion picture systems are disclosed in which exposure, processing and projection operations are carried out on a length of film contained at all times in a multipurpose cassette. The strip of film is initially wound on a supply spool within the cassette, and is advanced to a take-up spool when the cassette is placed in an appropriate camera for exposure in a conventional manner. After exposure, the cassette is placed into a projector apparatus which is capable of activating a cassette-contained processor to deposit a uniform coating layer of processing fluid along the length of the strip as it is rewound upon the supply spool. Thereafter, the apparatus projects the developed, recorded transparent images, and rewinds the film within the cassette for subsequent projection cycles.

The film used in such motion picture systems is exemplified by the disclosure of U.S. Pat. No. 3,848,871, issued July 15, 1975 to Edwin H. Land. The film is adapted to provide positive silver transfer images which may be viewed as a positive transparency without being separated from the developed negative image. Such films employ an additive color system in which light from the scene to be photographed passes a raster layer of color filters so that light-sensitive grains positioned behind the raster layer are exposed to different wave lengths of light corresponding to the color of the image photographed. On projection, the color is reproduced by the same raster layer in combination with the silver transferring images which, in themselves, are uncolored. While the film is particularly adapted for use in this system, it poses an additional problem to a camera-contained light source for enhancing the film speed.

SUMMARY OF THE INVENTION

In accordance with the present invention, a novel system is provided for the supplemental exposure of photographic film to increase the effective film speed. In this system, a supplemental light source is located within the camera such that the supplemental exposure light is directed onto the side of the film opposite from the side receiving the image-forming light from an objective lens. The supplemental exposure system of the present invention is particularly adapted for use in a movie camera for supplemental exposure of diffusion transfer additive color films contained in multipurpose cassettes. The supplemental exposure light source is synchronized with the camera shutter to effect the non-image forming exposure substantially simultaneously with the image-forming exposure of the film. Selective control means are provided to regulate the intensity and duration of the supplemental exposure light and as well as means for selecting exposure light of different wavelengths.

Among the objects of the present invention are: the provision of a method of providing supplemental exposure of photographic film, the provision of an in-camera supplemental exposure system for increasing the effective speed of a photographic film, and the provision of such a supplemental exposure system in a movie camera adapted for use with a film cassette containing diffusion transfer additive color film.

Other features, advantages and objects of the present invention will be apparent from the following detailed description when considered in conjunction with the accompanying drawings.

BRIEF DESCRIPTION OF THE DRAWINGS

FIG. 1 is a diagrammatic perspective view of a multipurpose cassette and a motion picture camera, partially cut away, incorporating the supplemental exposure system of the present invention;

FIG. 3 is a cross-sectional view of the camera as seen along line 3—3 of FIG. 2;

FIG. 4 is a perspective view showing the opposite side of the film cassette used with the supplemental exposure system incorporated into the camera of FIG. 1;

DETAILED DESCRIPTION OF THE PREFERRED EMBODIMENT

Figure 2:
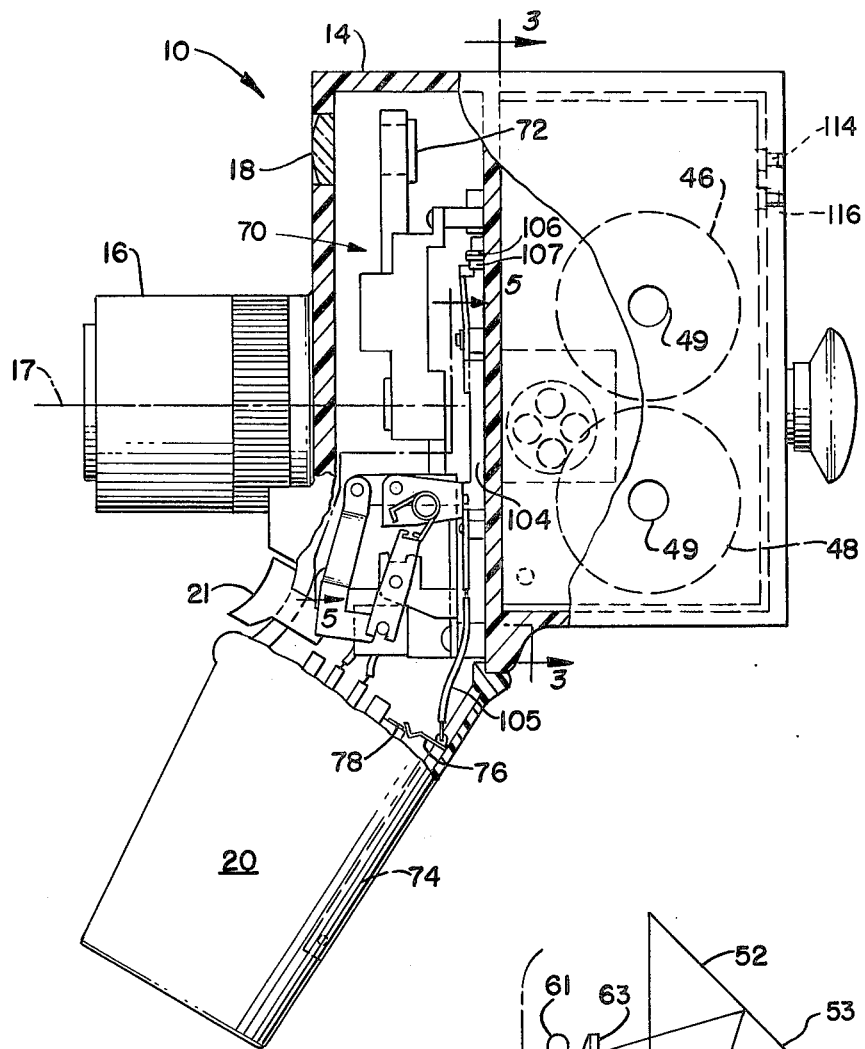
FIG. 2 is a side elevational view, partially in section, of the motion picture camera of FIG. 1.

Referring specifically to FIGS. 1 and 2 of the drawings, a motion picture camera, generally designated by the reference numeral 10, is shown in condition to receive a multipurpose film cassette 12. The camera 10 is of conventional design, and includes a body 14 mounting an objective lens system 16 which defines an optical axis 17 for the camera, an auxiliary lens 18 which transmits light to an exposure control system 70, a handle grip 20 with a shutter control trigger switch 21, a shutter control mechanism which is described more fully below, and an internal drive mechanism (not shown) by which the film strip in the cassette 12 may be advanced incrementally to expose successive frames to light images of objects or scenes formed by the lens system in accordance with well-known motion picture photography principles.

The camera body 14 has a chamber 22 for receiving the cassette 12 in such a manner that the film strip therein will be engaged through an opening 50 in the cassette by the camera drive mechanism, and also so that the drive shafts 24 and snubber roller stop 26 will engage the film spool sockets 49 and the snubber roller 54, respectively, of the cassette (FIG. 4). A closure door 28, pivoted on a hinge 30, is secured at the rear of the camera body 14 and is adapted to swing between an open position (FIG. 1) and a closed position over the chamber 22. Mounted on the closure door 28 and adjacent to the hinge 30 is a spring 32 which urges the cassette 12 to an operative position when the door is in its closed position. A latch housing 34 adjacent to the forward edge of the chamber 22, receives a latch pawl 36 provided adjacent to the forward edge of the closure door.

As shown in FIGS. 1, 2 and 4, the film cassette 12, which is described more fully in U.S. Pat. No. 3,895,862 issued to Joseph A. Stella on July 22, 1975, is essentially a rectangular parallelepiped having a pair of opposed, parallel side walls 38 and 39, edge walls 40 and 41, and end walls 42 and 43. A film strip 44 is contained within the cassette 12 and is connected at its ends to rotatably-supported supply and takeup spool 46 and 48, respectively, with each spool having drive sockets 49. In its passage from the supply spool 46 to the takeup spool 48, the film strip 44 is trained in a path past an opening 50 in the leading edge wall 40 which, in the operative condition of the camera 10, is positioned in alignment with the optical axis 17 formed by the objective lens system 16. The opening 50 permits exposure of a portion of the film strip 44 when the cassette 12 is operably received within the chamber 22 and facilitates, in the viewer apparatus (not shown), the passage of light through the film for viewing the film strip after film processing.

To enable image projection in the viewer (not shown), an aperture 51 (shown in FIG. 4) is provided in the side wall 39 of the film cassette 12, adjacent to the leading edge wall 40. A prism 52 is located adjacent the aperture 51 and in the side wall 39 of the cassette 12 such that during projection operations, light from a projection lamp (not shown) is admitted into the cassette 12 through the aperture 51, impinges upon an inclined surface 53 of the prism 52 and is directed through the portion of the film strip 44 positioned in front of the opening 50.

An opening 57 in the sidewall 39, below the aperture 51, provides access for the camera snubber roller stop 26 to engage a snubber roller 54 within the cassette 12. Directly opposite the prism 52 and in the side wall 38 is a vent opening 55 (FIG. 1) which enables the circulation of air through the cassette 12 for cooling the prism and for drying the film strip 44 after the film has been processed by a cassette-contained processor 56, as discussed more fully in the aforementioned U.S. Pat. No. 3,895,862.

Additionally, the cassette 12 is provided with a pair of electrical contacts 57 whose electrical continuity indicates an unprocessed film while the absence of such an electrical continuity indicates a processed film.

An automatic exposure control system is provided in the movie camera 10, and an exemplary system, described in U.S. Pat. No. 3,848,985, is adjusted automatically upon cassette insertion to accommodate any of several diverse film sensitivities, or ASA speeds. The speed of the film contained within a particular cassette being correlated to cassette discontinuities such as a lug 58 and a notch 59.

One embodiment of the supplemental exposure system of the present invention may be seen in FIGS. 1, 2 and 3. As shown in FIG. 3, the side of the camera body 14 opposite from the closure door 28 is provided with a protuberance 60 containing a low power light source 61, such as a light-emitting diode (LED). The source 61 is covered by, and separated from the cassette-receiving chamber 22 by a panel 62 carrying a low power lens 63 aligned with the light source 61 and the prism 52 to permit passage of light through the cassette aperture 51 to the prism 52 disposed within the cassette. To this end, the light source 61, the centerline of the lens 63 in the panel 62, and the centerline of the aperture 51 in the cassette are substantially coaxial when the film cassette 12 is in the operative position within the chamber 22 of the camera body 14. The lens 63, the spacing between the light source 61 and the prism 52 is adequate for the proper distribution of the light and coverage of the frame size of the conventional 8 mm movie film. The energization of the LED 61 is regulated by and substantially synchronously triggered with the operation of the camera shutter, as described more fully with respect to FIGS. 7 and 8.

Prior to discussing the operation of the supplemental exposure, the light source 61 will be described. The latter source preferably provides light of substantially a single wavelength, such as provided by a red LED, which would be suitable for general purpose applications. An example of a suitable red, solid state lamp is the MV5054 series lamp marketed by the Monsanto Company, which is made with a gallium arsenade phosphide diode mounted in a red epoxy package. Of course, other comparable lamps would be equally suitable. If a red LED or some other single-wavelength light source is used, it would then only be necessary to provide a single opening or clear lens 63 in the panel 62 which separates the light source 61 from the cassette-receiving chamber 22.

Since the reflecting prism 52 may be fabricated of any suitable material, such as plastic, it may contain imperfections which adversely affect the uniform distribution of the supplemental exposure light from the source 61. To correct this problem, the lens 63 is employed in the panel 62 to assure an even distribution of the light emitted from the prism.

Figure 5:
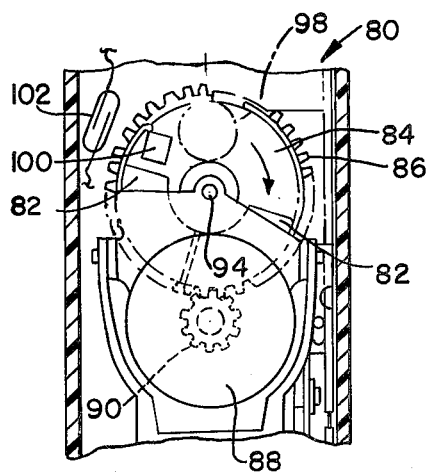
FIG. 5 is a front elevational view, partially in section, of the camera shutter control system as seen along line 5—5 of FIG. 2.

An example of a suitable shutter control system which may be incorporated into the camera 10 is described more fully in U.S. Pat. No. 3,751,149. Components of this system are shown in FIGS. 2 and 5. The exposure control system 70 includes a light-responsive cell 72 which receives light from the scene through the auxiliary lens 18 to automatically control a lens aperture (not shown) located on the lens axis 17. The handle grip 20 of the camera 10 houses a plurality of batteries (not shown) which provide the power source for energizing the exposure control system 70 and the shutter drive system incorporated within the camera. The handle grip 20 includes a master switch 74 provided along the back portion of the grip. The switch 74 is positioned so that it is closed by the normal grasping of the grip 20 to close the camera control circuit by sliding a switch contact 76 into engagement with a battery contact 78. The grip 20 is preferably arranged so that the closing of the master switch 74 will instantaneously activate the exposure control system 70 to set the proper exposure for the lens system 16 before the camera is activated by depression of the shutter trigger switch 21 to start and stop the motion picture taking process.

As seen in FIG. 5, the shutter system includes a rotatable shutter disc 80 provided with an open aperture portion 82 and an opaque blocking portion 84. The shutter disc 80 is arranged within the camera body 14 so that the open aperture portion 82 and the opaque portion 84 will sequentially rotate into alignment with the optical axis 17 of the lens system 16. In this regard, the camera taking aperture 98 is shown in dotted outline behind the opaque shutter portion 84. The periphery of the rotatable shutter disc 80 is provided with a ring gear 86. Rotation of the shutter disc 80 is effected by an electric drive motor 88, which is positioned adjacent to the shutter disc and meshes with the ring gear 86 through a drive pinion 90. The motor 88 will rotate the shutter disc 80 at a selected speed during the operation of the camera 10.

A magnet 100 is positioned adjacent the trailing edge of the opaque blocking portion 84 of the shutter disc 80 and is rotatable therewith. Cooperatively positioned with respect thereto is a magnetic reed switch 102, which is periodically triggered by the rotating magnet 100 to energize the light source 61 to supplementally expose the sequential frames of the film in synchronization with the operation of the shutter disc 80.

Turning again to FIG. 2, the energization of the motor 88 is accomplished by the operation of the shutter trigger switch 21, which drives a sliding switch plate 104 upwardly within the camera 10 when the trigger switch is depressed into the "run" condition. The switch plate 104 is a current-carrying member, and is connected to the power source contained in the handle grip 20 of the camera 10 by means of an electric lead 105. In the raised or "run" position, the switch plate 104 completes the circuit for the drive motor 88, and the motor operates to rotate the shutter disc 80 at a constant, selected speed in the direction shown by the arrow in FIG. 5.

Prior to generally describing the supplemental exposure operation, the film strip will be described with regard to FIG. 6. The film strip 44 may be of the diffusion transfer additive color type disclosed in the aforesaid U.S. Pat. No. 3,894,871. As disclosed in this patent, the film strip 44 comprises a transparent support 109, forming a front layer as viewed in the camera 10, and carrying an additive color screen, or raster layer, 110 composed of alternating red, green and blue filter segments or elements. An image-receiving layer 111 and a silver halide emulsion layer 112 are successively mounted behind the raster layer 110. Finally, an innermost layer 114, sometimes referred to as an "overcoat" or "top coat" forms the back surface as viewed in the camera 10. This innermost layer 114 is free of silver halide or silver-precipitating agents, is permeable to the processing composition and has been found to provide a number of useful benefits. Such a layer may be used to carry one or more of agents, such as anti-halation dyes and/or image-stabilizing agents, useful in the film-development process. Additional information regarding the structure, chemical composition, fabrication, processing, etc., of the film 44 may be had by reference to the aforesaid U.S. Pat. No. 3,894,871.

Figure 6:
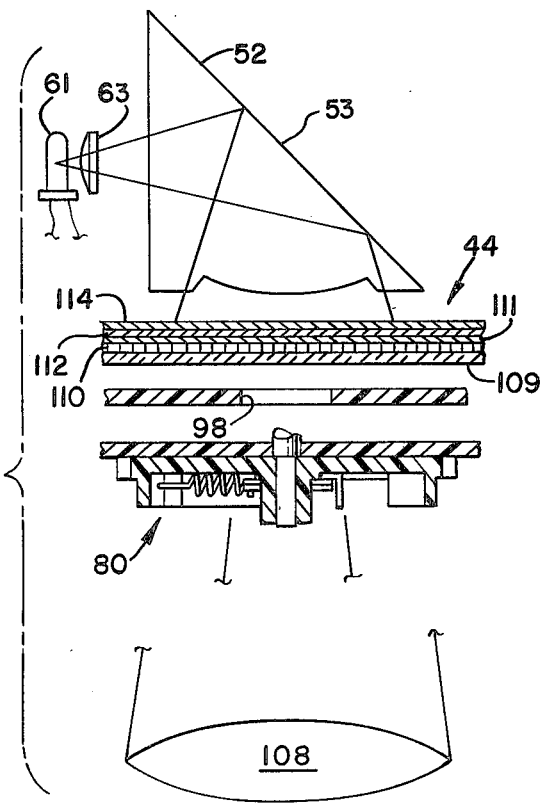
FIG. 6 is a diagrammatic view, to an enlarged scale, illustrating the supplemental exposure method of the present invention.

The operative principal of the in-camera supplemental exposure system of the present invention may be more clearly seen by reference to the schematic illustration of FIG. 6. When the light source 61 is energized, a short burst of emitted light passes through the lens insert 63, enters the prism 52 and impinges upon the inclined, reflective surface 53. The light is then directed by the prism 52 onto the back surface 114 of the film strip 44. Substantially simultaneously therewith, scene exposure begins with light reflected from the object or scene to be photographed passing through the objective lens system 16 of the camera 10, of which one lens element 108 is shown in the figure. Light passing through the lens element 108 is passed by the open shutter portion 82, operated in the fashion described above, and through the camera image aperture 98 to impinge upon the front surface 109 of the film strip 44.

Figure 7:
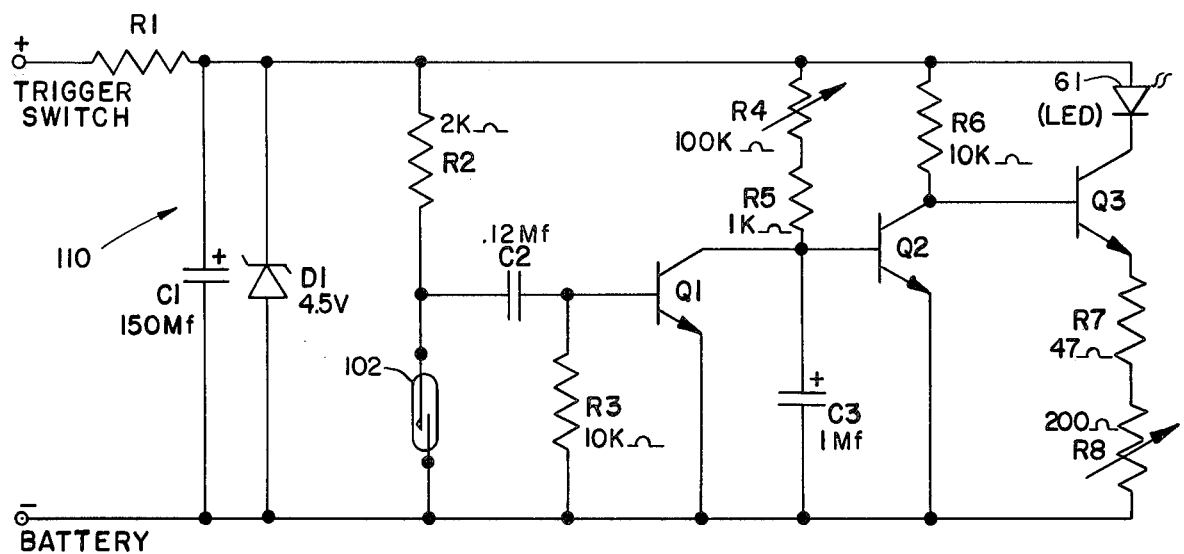
FIG. 7 is a circuit diagram of a suitable control system for synchronizing the camera shutter operation with the energizing of the supplemental exposure light source.

An example of a suitable control circuit, which is operatively coupled to the shutter control system described above, for controlling the energization of the light source 61 with the operation of the rotatable shutter disc 80 is shown in the diagram of FIG. 7. The positive (+) and negative (−) terminals of the circuit are connected, respectively, through the shutter trigger switch 21 to the batteries (not shown) disposed within the handle grip 20. The input portion 110 of the circuit includes a resistor R1 in series with the parallel arrangement of a capacitor C1 and a zener diode D1 which function to smooth out any noise generated by the electric drive motor 88 and to regulate the voltage supplied by the batteries.

The reed switch 102, previously shown in FIG. 5, is in series with a resistor R2. One terminal of a capacitor C2 is connected between the resistor R2 and the reed switch 102 while its other terminal is connected to the base of a first transistor Q1. A resistor R3 also connects the base of the transistor Q1 to the negative lead of the circuit. A time delay circuit for controlling the duration of the energization of the point light source 61 includes a variable resistor R4 in series with a fixed resistor R5 coupled to the collector of transistor Q1 and in series with a capacitor C3. In parallel with this leg of the circuit is a fixed resistor R6 in series with the collector of a second transistor Q2; the base of the transistor Q2 being connected to the collector of transistor Q1 and to the circuit leg between the resistor R5 and the capacitor C3.

The point light source 61, or light emitting diode (LED), such as the MV5054 source previously described, is in series with the collector of a third transistor Q3. A fixed resistor R7 and a variable resistor R8 joins the emitter of the transistor Q3 to the negative lead of the circuit while the base of this transistor Q3 is connected to the collector of the transistor Q2 and to the resistor R6. The circuit is arranged such that the light source 61 is energized for a short interval (determined by the RC circuit of R4, R5 and C3) only when the reed switch 102 opens. Hence, once the light source has been fired, the fact that the switch 102 remains open or is subsequently closed has no immediate effect on the light source 61 as will be more fully explained below.

Assuming that the reed switch 102 is initially in a closed condition because the magnet 100 disposed on the trailing edge of the opaque portion 84 of the shutter disc 80 is positioned adjacent to the reed switch, the transistors are in a stable state, with the transistor Q1 off, the transistor Q2 on, and the transistor Q3 off. As the shutter moves during normal exposure operations of the camera, with continued energization of the electric drive, the magnetic field is removed from the switch 102 thereby causing it to open.

Opening of the reed switch 102 causes the capacitor C2 to discharge which increases the voltage supplied to the base of the transistor Q1 thereby turning the latter on. With the transistor Q1 being turned on, or in the conducting state, a conducting path is formed from resistor R5 and the capacitor C3 which reduces the voltage at the base of transistor Q2, thereby turning this transistor off. As the transistor Q2 turns off, the voltage applied to the base of the transistor Q3 is increased to turn the transistor Q3 on, thus completing a circuit, through the resistor R1 and the diode light 61, the transistor Q3, and the resistors R7 and R8, and thereby energizing the diode light 61 (LED). At this point in time, the shutter disc 88 has rotated to position wherein the aperture portion 81 is in alignment with the optical axis 17 and the camera image aperture 98.

The capacitor C2 is a small capacitor which charges rapidly. Hence, when the switch 102 opens the base of transistor Q1 is momentarily positive, thereby turning this transistor on. However, as the capacitor C2 rapidly charges to equilibrium (switch 102 remaining open) the transistor Q1 is again turned off. While the latter transistor is on, the capacitor C3 is held in a discharged condition and transistor Q2 is held off so that the transistor Q3 and the light source 61 are on.

As soon as the capacitor C2 charges up, transistor Q1 reverts to its steady state off condition. The latter then allows capacitor C3 to charge up; its charging rate being controlled by resistors R4 and R5. Once the capacitor C3 charges up, the transistor Q2 turns on thereby turning off the transistor Q3 and extinguishing the light source 61.

The system remains in this condition while the shutter completes its revolution, at which time the shutter carried magnet 100 again closes the switch 102. The closing of the switch 102, however, continues to maintain the base of the transistor Q1 negative. Hence, this transistor Q1 remains off such that the complete circuit remains in its steady state condition with the lamp off until the switch again opens.

Consequently, the time that the light 61 remains on is essentially dependent on the charging rate of the capacitor C3 and the value of the resistors R4 and R5; with the value of the resistor R4 being selectively adjustable to vary the time that the supplemental exposure light 61 is on. Further, the current level passed through the diode light 61, and the brightness of the supplemental exposure light, is determined by the value of the adjustable resistor R8, which, as explained below, can be manually regulated. Preferably, the resistor R8 is set to draw 30 milliamps through the MV5054 lamp previously described.

Figure 8:
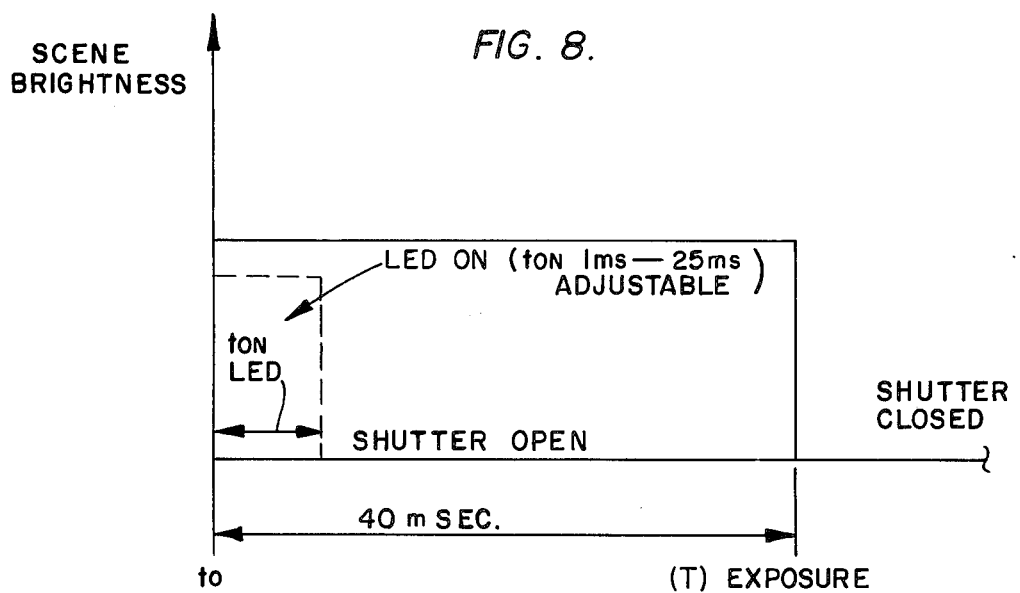
FIG. 8 is a diagram of one possible phase relationship between the duration of energization of the supplemental exposure light and the shutter opening.

For a normal-speed movie, the shutter may remain open for a period of 30 to 40 milliseconds. As shown in the diagram of FIG. 8, which illustrates the scene exposure brightness of a given frame of film strip versus time, the total time $t_{on}$ during which the point light source 61 is energized, is relatively short in comparison to the overall period during which the shutter remains open, or that is, the exposure time $t_{exp}$. Preferably, the LED is turned on just prior to or synchronously with opening of the shutter. However, it should be noted that the light source 61 may be turned on and off at any time within the forty-millisecond interval that the shutter is opened. Variation of R4 in the circuit of FIG. 8 provides a range in which the supplemental exposure light source remains energized from one millisecond to twenty-five milliseconds. Preferably, however, supplemental exposure light is in synchronization with the opening of the shutter, and remains on for a period of approximately 3.5 milliseconds while the shutter is open. Then the supplemental light is turned off and the shutter proceeds through the remainder of its open cycle.

Since there may be situations in which it would be desirable to energize the supplemental light source 61 at some point during the shutter-open interval other than at the beginning of shutter opening, a manually-operable control (not shown) may be provided on the camera body 14 which will displace the switch 102 in parallel to the shutter path so as to alternately provide for LED energization before or after shutter opening or toward the end of the image exposure period as opposed to the beginning of the period. Further, there will be situations in which, due to the nature of the scene to be photographed or the type of film employed, it would be desirable to control either the duration or the intensity of the supplemental exposure light source. Therefore, the variable resistors R4 and R8 are provided as manually-operable control potentiometer, designated 114 and 116 mounted on the rear wall 118 of the camera 10 as shown in FIGS. 1 and 2 to permit the adjustment of the duration and intensity of the supplemental exposure light source, in accordance with the adjustment capabilities provided in the circuit of FIG. 7.

Instead of utilizing manually-operable control means to vary the length of the supplemental exposure period and its intensity, automatic control means on the cassette case similar to the lugs 58 and the notch 59, may be provided to control the amount of supplemental exposure, depending upon the particular type of film contained in the cassette. Thus, depending upon the position of an appropriate protuberance on the cassette case 12, appropriate control means within the camera 10 would be conditioned to set the value of the resistances R4 and R8 in the circuit of FIG. 7.

In the foregoing discussion, one embodiment of the supplemental exposure was contemplated in which the light source 61 would provide light of a single wavelength, such as provided by a red LED, there are, however, photographic situations which may require a supplemental exposure light of a wavelength different from the single-wavelength light installed in the camera. These situations may involve the use of different types of film in the camera, the use of colored filters on the objective lens system, differences between indoor and outdoor ambient light, the use of auxiliary flash lighting, and the like. Therefore, an alternate embodiment of the light source is shown in FIG. 9, which illustrates a more flexible and versatile supplemental exposure system.

Figure 9:
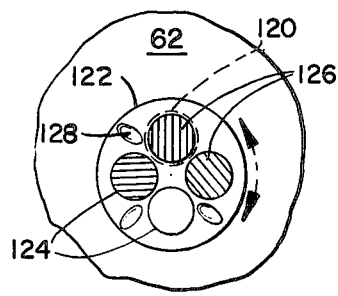
FIG. 9 is an enlarged plan view showing an alternate embodiment of the supplemental light source arrangement with means for changing the wavelength of the supplemental exposure light.

Instead of a narrow band source such as a red LED, a white LED 120, shown in dotted outline in FIG. 9, is disposed in the housing 60 with a manually-adjustable color filter disc 122 positioned between the LED and the reflecting prism 52. The filter disc 122 is of circular configuration rotatably mounted in the panel 62. Four holes 124 are equally spaced on the filter disc 122, with each of the holes being provided with an insert 126 of a different color.

These colored inserts 124 may be of any suitable color, such as red, blue, green and white or clear. The portion of the surface of the disc 64 which is accessible when the camera door is open is provided with a plurality of indentations 126 which may be engaged, to rotate the disc so as to bring a selected one of the colored inserts 126 into alignment with the white LED light source 61 and the opening 51 in the wall of the cassette 12, and thereby provide for changing the wavelength of the light used in the supplemental exposure of the film strip 44. The colored inserts 128 may also be shaped into the proper, correcting-lens configuration, as illustrated in FIG. 3.

Additionally, the filter disc 122 may also be utilized for varying the magnitude of the supplemental exposure illumination. That is, each insert 124 may be a filter of different density. In the latter case, when used with a single wavelength source, only the magnitude will vary with the different filter positions whereas, when a broadband light source (as in FIG. 9) is employed and each insert is both colored and of selected density, both the wavelength and magnitude may be controlled. Further, the embodiment of FIG. 9 may also be employed with a pair of overlying, independently rotatable discs, one of different colors and the other having different densities to control both wavelength and magnitude.

Thus, it will be seen that as a result of the present invention, a unique, effective and highly versatile in-camera supplemental exposure system is provided for a motion picture cassette system of the type described, and by which the above-mentioned objectives are completely fulfilled. Also, it will be appreciated by those skilled in the art that various modifications in the embodiments of the invention disclosed and illustrated herein may be made without departing from the invention. For example, while the foregoing description has related the supplemental exposure system of the present invention to the operative environment of a movie camera, it can be seen that the system can be readily adapted to a still photography camera. It is expressly intended, therefore, that the foregoing description is illustrative only, not limiting, of preferred embodiments and that the true spirit and scope of the present invention be determined by reference to the appended claims.

What is claimed is:

1. In a photographic movie camera employing a film cassette, said cassette having a housing for retaining a photographic film strip, said cassette housing being a parallelepiped structure having a pair of large planar wall surfaces joined by narrow edge walls with a first opening in one of said edge walls and a second opening in one of said planar walls, said cassette housing including means for guiding said film strip along a path wherein its planar film surfaces are in parallel to said one of said edge walls with one of said film surfaces facing outwardly of said cassette and the opposite film surface facing inwardly thereof so that said one film surface is presented at said first opening to receive image-forming rays during exposure, and transmit image-forming rays during subsequent projection, and reflecting means located in said cassette in operative relation to said second opening and said opposite film surface so as to redirect light entering said second opening toward said opposite film surface of said film strip for projection operations, said camera including means for receiving said cassette and for cooperating with said first opening for transmitting image-forming rays from the scene to be photographed along a given optical path to said one film surface, and actuatable means for unblocking and blocking said given optical path to provide an exposure interval, the improvement comprising means responsive to actuation of said unblocking and blocking means for directing supplemental illumination through said second opening to said reflecting means and to said opposite film surface during exposure operations, said directing means including an electric lamp mounted in said camera in a location adjoining said second opening, and means responsive to actuation of said unblocking and blocking means for energizing said lamp so as to direct light to said reflecting means and said opposite film surface during exposure operations.

2. The improvement of claim 1 wherein said means for energizing said lamp is responsive to actuation of said unblocking and blocking means so as to energize said lamp in substantial synchronism with a portion of said exposure interval.

3. The improvement of claim 2 wherein said energizing of said lamp is in substantial synchronism with the initiation of said exposure interval.

4. The improvement of claim 1 including a filter mounted for displacement into and out of operative alignment with said lamp and said second opening.

5. The improvement of claim 1 including a filter disc rotatably mounted in operative relation to light transmitted from said lamp to said second opening, said disc having a plurality of filters located around the perimeter of said disc such that upon rotation of said disc, each filter is separately brought into operative alignment with the light directed by said lamp into said second opening.

6. The improvement of claim 1 wherein said unblocking and blocking means is repeatably operable in synchronism with intermittent advancement of said film strip for motion picture exposure operations to provide a said exposure interval of given duration, and said supplemental light directing means includes means for energizing said lamp substantially in synchronism with a portion of each said exposure interval for a time of relatively short duration as compared to said given duration.

* * * * *